United States Patent
Huang

(10) Patent No.: US 7,570,873 B2
(45) Date of Patent: Aug. 4, 2009

(54) SUBTITLE FILE LOADING METHOD AND SYSTEM THEREOF

(75) Inventor: King Huang, Hsin-Tien (TW)

(73) Assignee: Via Technologies, Inc., Taipei (TW)

(*) Notice: Subject to any disclaimer, the term of this patent is extended or adjusted under 35 U.S.C. 154(b) by 733 days.

(21) Appl. No.: 11/236,599

(22) Filed: Sep. 28, 2005

(65) Prior Publication Data

US 2006/0088293 A1  Apr. 27, 2006

(30) Foreign Application Priority Data

Oct. 22, 2004   (TW) ............................... 93132220 A

(51) Int. Cl.
*H04N 7/00* (2006.01)
*H04N 7/26* (2006.01)
(52) U.S. Cl. ......................................... 386/95; 386/109
(58) Field of Classification Search ................... 386/95, 386/46, 109, 111, 112, 124, 125, 45
See application file for complete search history.

(56) References Cited

U.S. PATENT DOCUMENTS 5,987,214 A * 11/1999 Iwamura ....................... 386/95

FOREIGN PATENT DOCUMENTS

| CN | 1140311 | 1/1997 |
|---|---|---|
| CN | 1302405 | 7/2001 |

* cited by examiner

*Primary Examiner*—Robert Chevalier
(74) *Attorney, Agent, or Firm*—Rabin & Berdo, P.C.

(57) ABSTRACT

The present invention relates to a subtitle file loading method for loading subtitle files from a disc to a memory of a disc player. The memory has a first memory block and a second memory block. A first group of subtitle files is first loaded into the first memory block. Then, the first group of subtitle files in the first memory block is transferred to a subtitle file decoder for decoding, while a second group of subtitle files is loaded into the second memory block. Thereafter, the second group of subtitle files is transferred to the subtitle file decoder for decoding, and a third group of subtitle files is loaded into the first memory block. The steps described above are repeated in an alternative process until all subtitle files are loaded into the memory.

10 Claims, 6 Drawing Sheets

SUBTITLE FILE LOADING METHOD AND SYSTEM THEREOF

RELATED APPLICATIONS

The present application is based on, and claims priority from, Taiwan Application Ser. No. 93132220, filed Oct. 22, 2004, the disclosure of which is hereby incorporated by reference herein in its entirety.

BACKGROUND

1. Field of Invention

The present invention relates to a subtitle file loading method of a disc player. More particularly, the present invention relates to a subtitle file loading method of a disc player for loading subtitle files in an efficient way.

2. Description of Related Art

When a disc player plays subtitles, subtitle files are first retrieved from a disc and stored in a memory of the disc player. The subtitle files stored in the memory are further transferred to a subtitle file decoder for decoding. The subtitle file decoder decodes the subtitle files into address signals and display signals. The address signals and the display signals are transferred to a register and a buffer, respectively. The display signals contain the subtitle images to be displayed, while the address signals indicate the addresses of the display signals to be displayed on the displaying device. Afterward, the display signals stored in the buffer are transferred to corresponding addresses on the displaying device according to the address signals in the register.

FIG. 1 is a block diagram illustrating a conventional subtitle file playing system. The subtitle file playing system 100 includes a memory 110, a subtitle file decoder 120, a register 130 and a buffer 140. Subtitle files 102 stored in the disc 101 are first loaded into the memory 110 of subtitle file playing system 100 for temporary storage. Next, the subtitle files 102 are transferred to the subtitle file decoder 120 for decoding into address signals 103 and display signals 104. The display signals 104 contain the subtitle images to be displayed on the displaying device 105, while the address signals 103 indicate the addresses of the display signal 104 to be displayed on the displaying device 105. The address signals 103 and the display signals 104 are further transferred to a register 130 and a buffer 140, correspondingly. The display signals 104 are then transferred to corresponding addresses on the displaying device 105 according to the address signals 103 in the register 130.

FIG. 1 is also a diagram further illustrating how the subtitle files 102 are loaded into the memory 110 from the disc 101 in the prior art. If the memory 110 has the capacity of storing N subtitle files, then those N subtitle files are first loaded sequentially from the disc 101 into the memory 110. Next, the N subtitle files loaded into the memory 110 are further transferred to the subtitle file decoder 120 for sequential decoding. After all N subtitle files in the memory 110 are transferred to the subtitle file decoder 120, the next N subtitle files will be loaded into the memory 110 from the disc 101.

However, the conventional subtitle file loading approach will cause delay or interruption during the subtitle files playing. Since the next N subtitle files must be loaded into the memory from the disc only after the previous N subtitle files have already been transferred to the subtitle file decoder, there is no subtitle file for decoding and subsequent playing while the next N subtitle files are being loaded. Therefore, the playback process of subtitle files would be not smooth by lacking of decoded subtitle files to be played.

SUMMARY

The present invention provides a subtitle file loading method for loading subtitle files into a memory from a disc more efficiently than before.

The present invention also provides a subtitle file playing system of a disc player that avoids interrupting disc playing.

The present invention further provides a subtitle file playing method of a disc player for playing the subtitle files smoothly without interruptions.

In accordance with the foregoing and other objectives of the present invention, a method for loading subtitle files from a disc to the memory of a disc player is proposed. The memory of the disc player includes a first memory block and a second memory block. According to the subtitle file loading method of the present invention, a first group of subtitle files is loaded into the first memory block of the memory. Next, the first group of subtitle files in the first memory block is transferred to a subtitle file decoder for decoding, while a second group of subtitle files is loaded into the second memory block simultaneously. Thereafter, the second group of subtitle files is transferred to the subtitle file decoder for decoding, while a third group of subtitle files is loaded into the first memory block. The above steps are repeated in an alternative process until all subtitle files are loaded into the memory of the disc player.

In accordance with another objective of the present invention, a subtitle file playing system for a disc player is proposed. The subtitle file playing system includes a memory, a subtitle file decoder, a register and a buffer. The memory includes a first memory block and a second memory block. The subtitle files are loaded into the first memory block and the second memory block of the memory alternatively. When a second group of subtitle files is loaded into the second memory block, a first group of subtitle files previously loaded into the first memory block is transferred to the subtitle file decoder. The subtitle file decoder decodes the subtitle files into address signals and display signals. The register stores the address signals, while the buffer stores the display signals.

According to the subtitle file loading method of the present invention, the memory of the disc player is divided into memory blocks with subtitle files loaded therein in an alternative process. During the same period, some subtitle files are transferred to related subtitle file decoder for decoding, while other subtitle files are loaded into related memory block. Therefore, interruptions or delay during subtitle file playing can be avoided because the subtitle files can be provided sequentially and continuously. Besides, the required memory capacity can also be minimized while compared with the memory capacity required in the prior art. Therefore, the manufacturing cost can be reduced significantly so as to increase product competitiveness.

It is to be understood that both the foregoing general description and the following detailed description are by examples, and are intended to provide further explanation of the invention as claimed.

BRIEF DESCRIPTION OF THE DRAWINGS

These and other features, aspects, and advantages of the present invention will become better understood with regards to the following description, appended claims, and accompanying drawings where:

DESCRIPTION OF THE PREFERRED EMBODIMENTS

Figure 1:
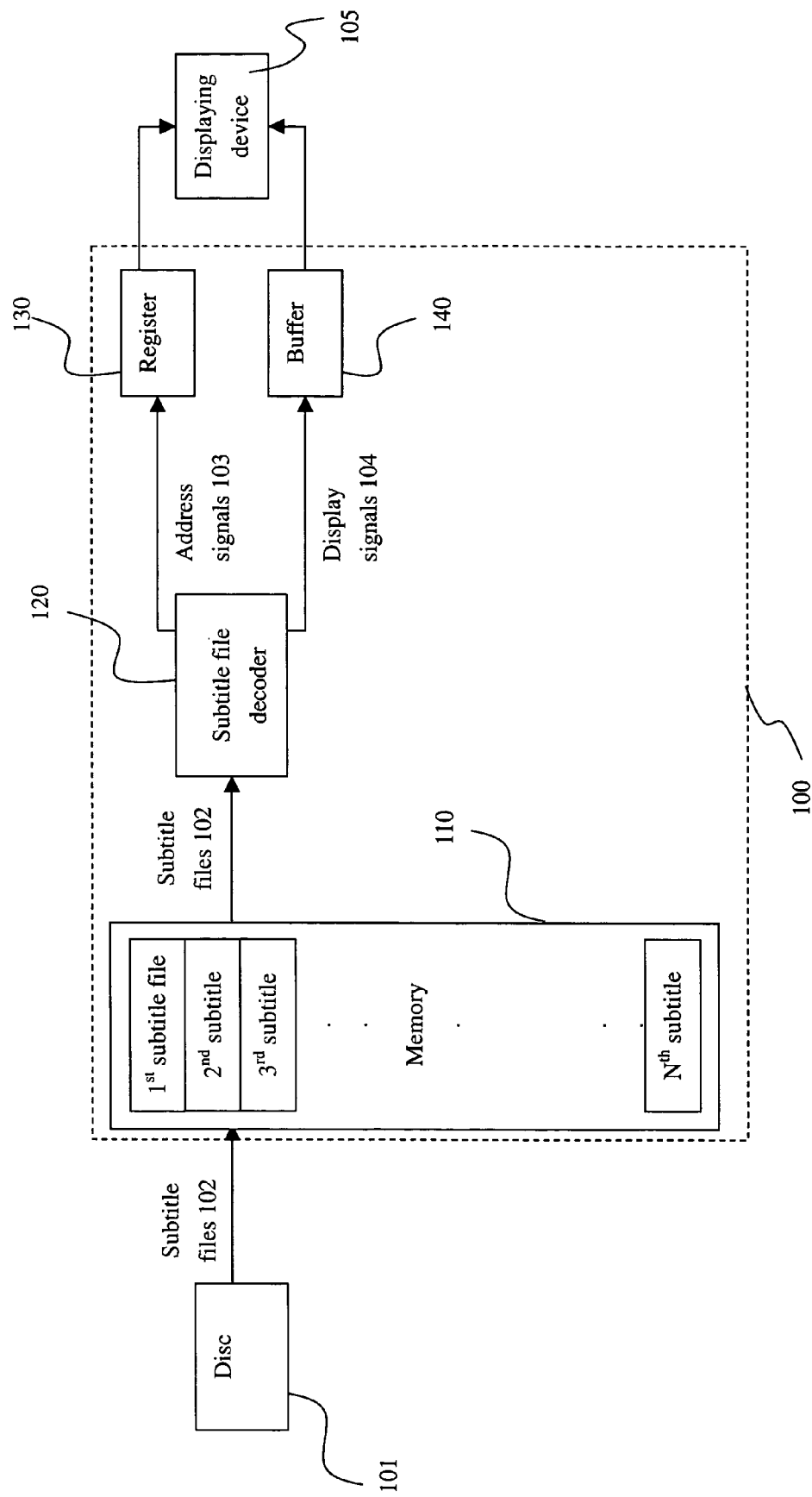
FIG. 1 is a block diagram illustrating a conventional subtitle file playing system.

Reference will now be made in detail to the present preferred embodiments of the invention, examples of which are illustrated in the accompanying drawings. Wherever possible, the same reference numbers are used in the drawings and the description to refer to the same or like parts.

According to the subtitle file loading method of the present invention, the memory of the disc player is divided into two memory blocks or several memory blocks. The subtitle files are also divided into several groups of subtitle files and those groups of subtitle files are loaded into these memory blocks in an alternative process from the disc. While one group of subtitle files stored in one memory block is transferred to the subtitle file decoder for decoding, another group of subtitle files is loaded into another memory block from the disc. As a result, in any instance, there are groups of subtitle files in the memory that can be provided to the subtitle file decoder for decoding. Playing interruptions and delays caused by the loading of subtitle files from the disc can therefore be avoided.

Figure 2:
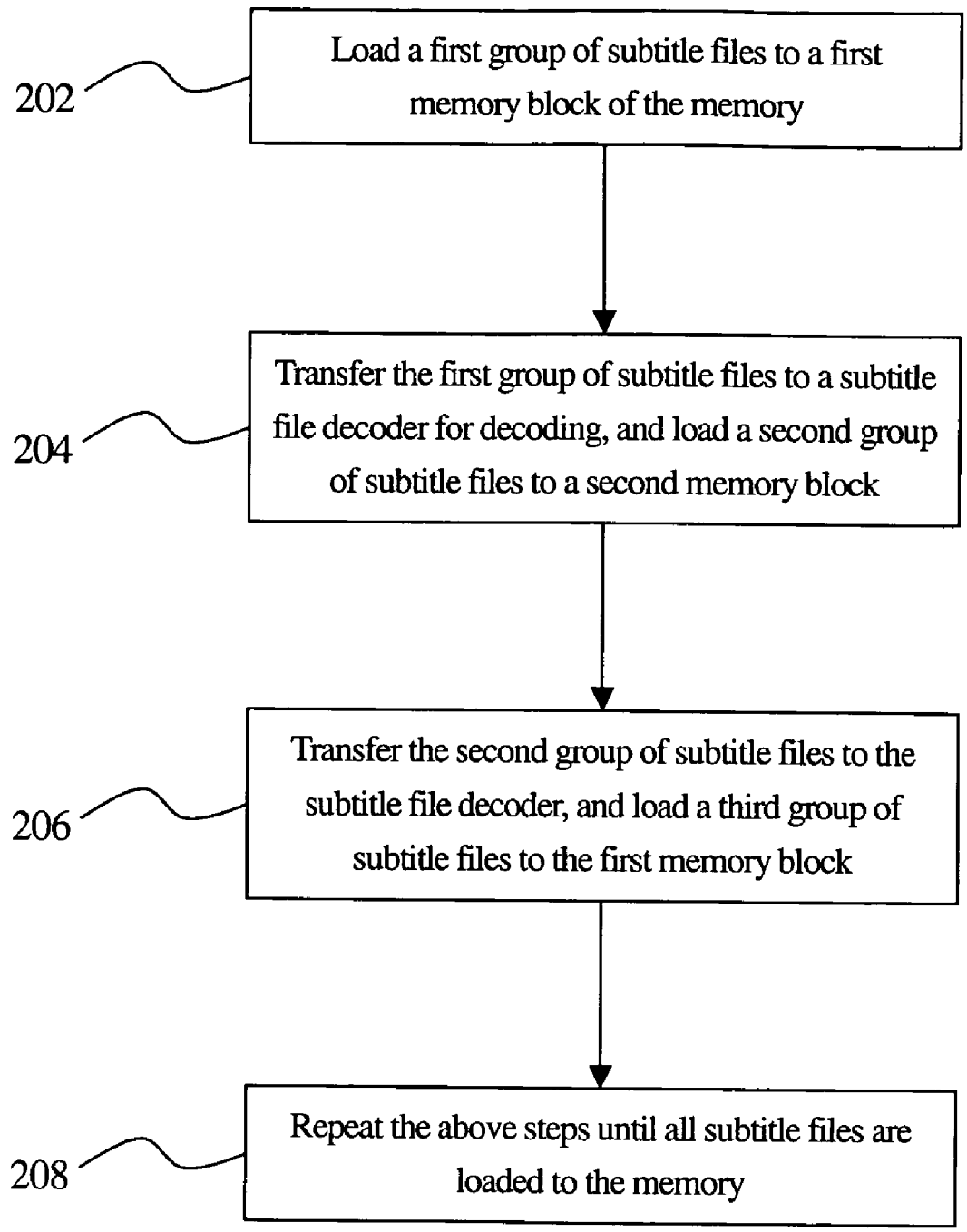
FIG. 2 is a flowchart illustrating the subtitle file loading method according to the present invention.

FIG. 2 is a flowchart illustrating the subtitle file loading method of the disc according to one preferred embodiment of the present invention. The subtitle file loading method according to one preferred embodiment of the present invention loads the subtitle files in the disc to the memory of the disc player in an alternative process. The memory of the disc player, such as a DRAM, a FIFO, an EEPROM or a flash memory, includes a first memory block and a second memory block. A first group of subtitle files is first loaded into the first memory block of the memory (step 202). Next, the first group of subtitle files in the first memory block is transferred to the subtitle file decoder for decoding, while the second group of subtitle files is loaded into the second memory block of the memory simultaneously (step 204). Thereafter, the second group of subtitle files in the second memory block is transferred to the subtitle file decoder for decoding, while the third group of subtitle files is loaded into the first memory block of the memory simultaneously (step 206). Then the above steps are repeated in an alternative process until all groups of subtitle files are loaded into the memory of the disc player (step 208).

Figure 3:
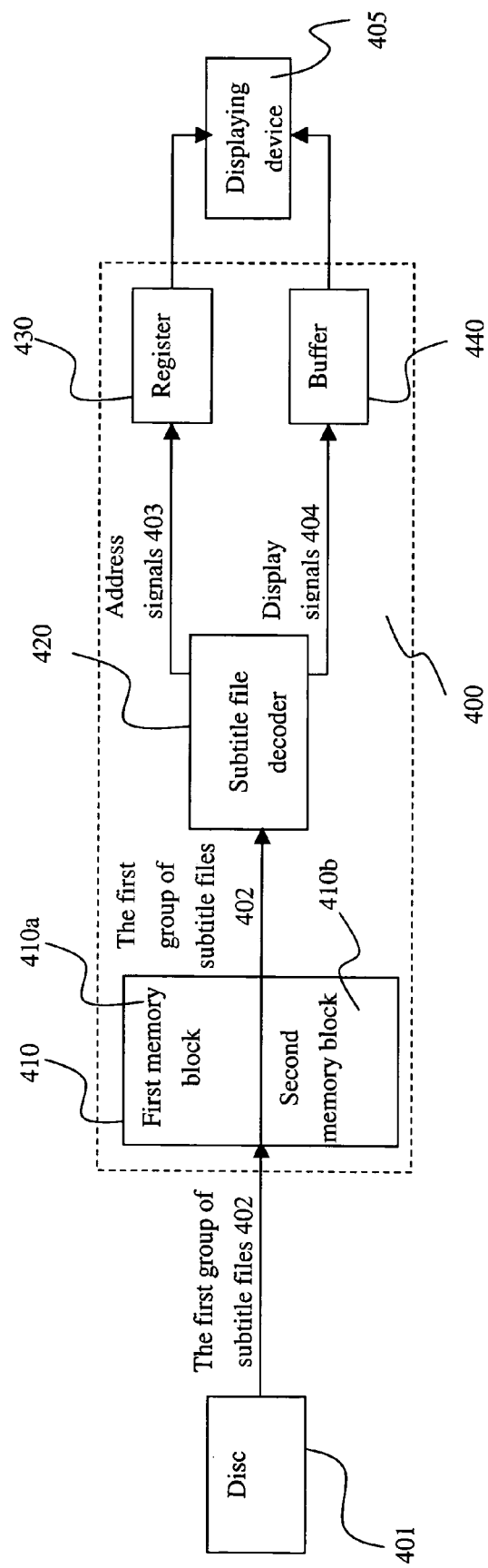
FIG. 3 is a block diagram illustrating the subtitle file playing system according to one preferred embodiment of the present invention.
Figure 4:
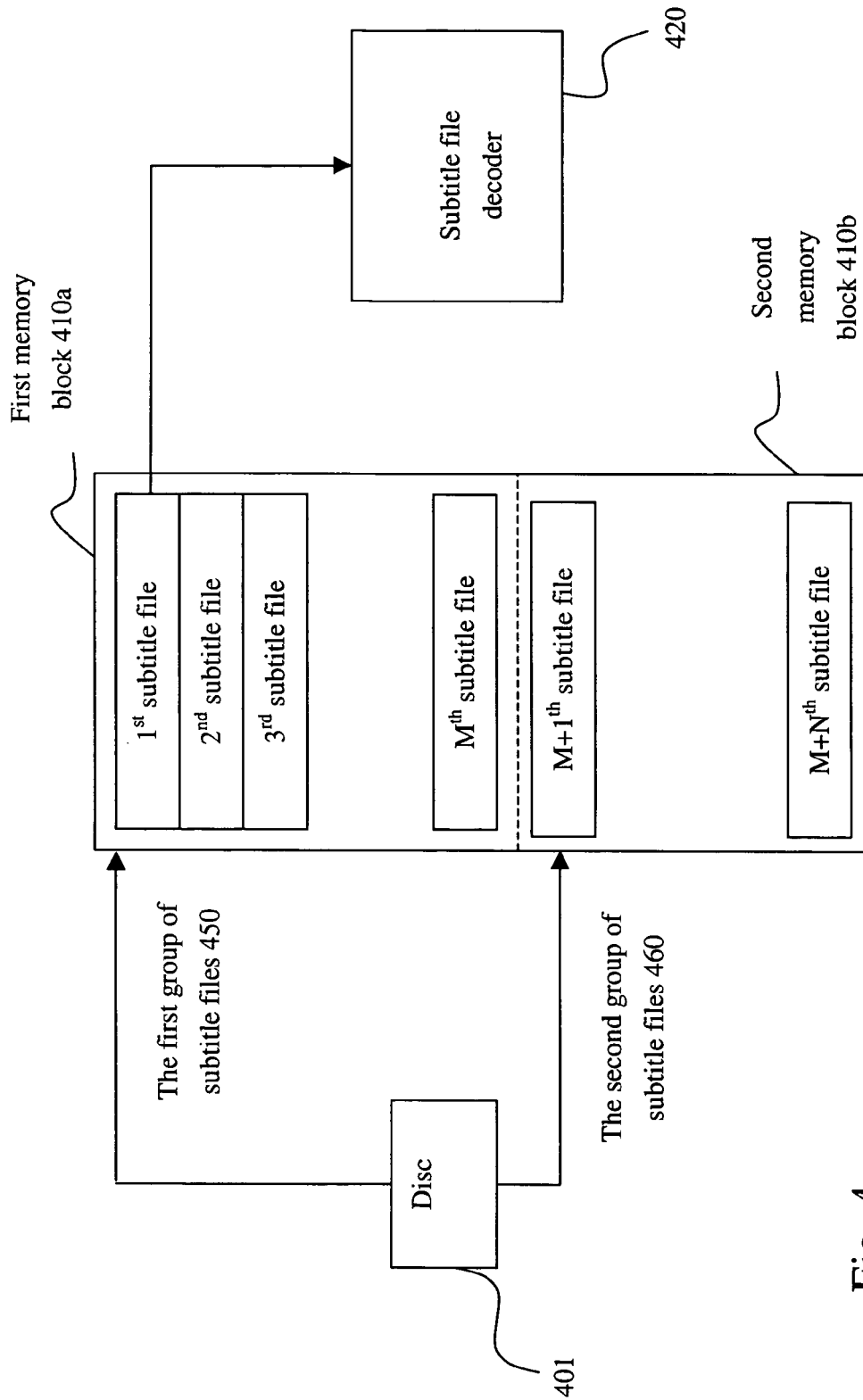
FIGS. 4-5 are diagrams illustrating how the subtitle files are loaded into the memory according to one preferred embodiment of the present invention.
Figure 5:
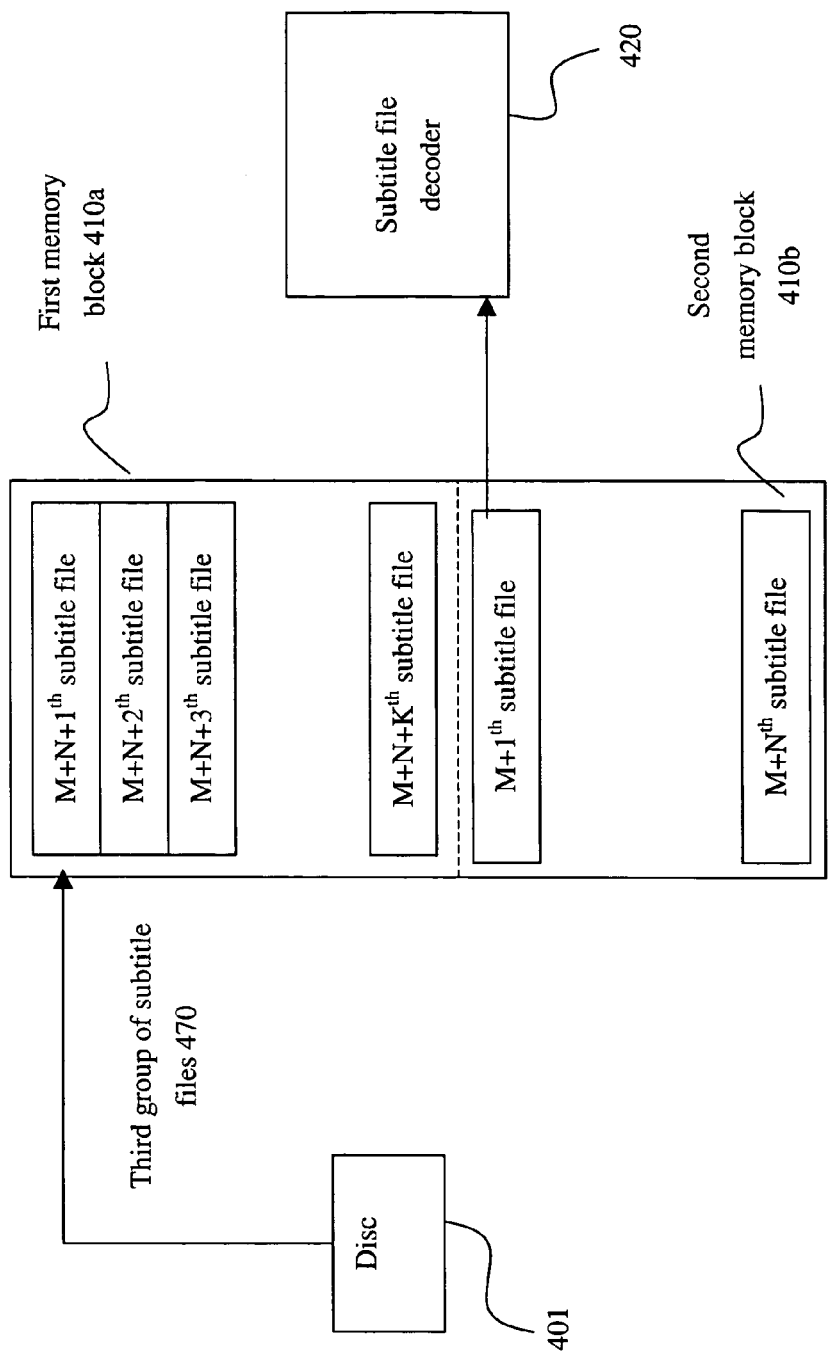

FIG. 3 to FIG. 5 are diagrams illustrating a subtitle file playing system of a disc player according to one preferred embodiment of the present invention. FIG. 3 is a block diagram illustrating the subtitle file playing system 400 according to one preferred embodiment of the present invention. The subtitle file playing system 400 includes a memory 410, a subtitle file decoder 420, a register 430, and a buffer 440. The memory 410 includes a first memory block 410*a* and a second memory block 410*b*. The first group of subtitle files 402 stored in the disc 401 is first loaded into the first memory block 410*a* and the second group of subtitle files stored in the disc 401 is loaded into the second memory block 410*b* in an alternative process (not shown in the FIG. 3). While the second group of subtitle files is loaded into the second memory block 410*b* from the disc 401, the first group of subtitle files 402 previously stored in the first memory block 410*a* is transferred to the subtitle file decoder 420 for decoding. Similarly, while the second group of subtitle files in the second memory block 410*b* is transferred to the subtitle file decoder 420 for decoding, other group of subtitle files (such as the third group of subtitle files) is loaded into the first memory block 410*a*. Alternatively, the loading and transferring steps described above can be suspended if the subtitle file decoder 420 does not request subtitle files from the memory 410.

The first group of subtitle files 402 transferred to the subtitle file decoder 420 is decoded into address signals 403 and display signals 404. The display signals 404 are subtitle images to be displayed on the displaying device 405, while the address signals 403 are for indicating the display addresses of the display signals 404 on the displaying device 405. The address signals 403 and the display signals 404 are further stored in the register 430 and the buffer 440, respectively. The display signals 404 in the buffer 440 are then displayed on the displaying device 405 according to the address signals 403 in the register 430.

FIG. 4 and FIG. 5 are diagrams illustrating how the subtitle files are loaded into the first memory block 410*a* and the second memory block 410*b* of the memory 410 in an alternative process. As shown in the FIG. 4, the memory 410 is divided into a first memory block 410*a* and a second memory block 410*b*. The capacity of the first memory block 410*a* and the second memory block 410*b* can be equal or non-equal. A first group of M subtitle files 450, from $1^{st}$ to $M^{th}$ subtitle files, are loaded sequentially into the first memory block 410*a* of the memory 410 from the disc 401.

After all M subtitle files of first group are loaded into the first memory block 410*a* of the memory 410, as shown in the FIG. 4, those M subtitle files stored in the first memory block 410*a* of the memory 410 are transferred to the subtitle file decoder 420 for decoding sequentially, while the second group of N subtitle files 460, from $(M+1)^{th}$ to $(M+N)^{th}$ subtitle files are sequentially loaded into the second memory block 410*b* of the memory 410.

As shown in the FIG. 5, the N subtitle files from $(M+1)^{th}$ to $(M+N)^{th}$ stored in the second memory block 410*b* are then transferred to the subtitle file decoder 420 for decoding, while the third group of K subtitle files 470, from $(M+N+1)^{th}$ to $(M+N+K)^{th}$ subtitle files are loaded into the first memory block 410*a* of the memory 410. As a result, the subtitle files in the memory 410 can be provided to the subtitle file decoder 420 for decoding at any instance, and interruptions during subtitle file playing can therefore be avoided.

Figure 6:
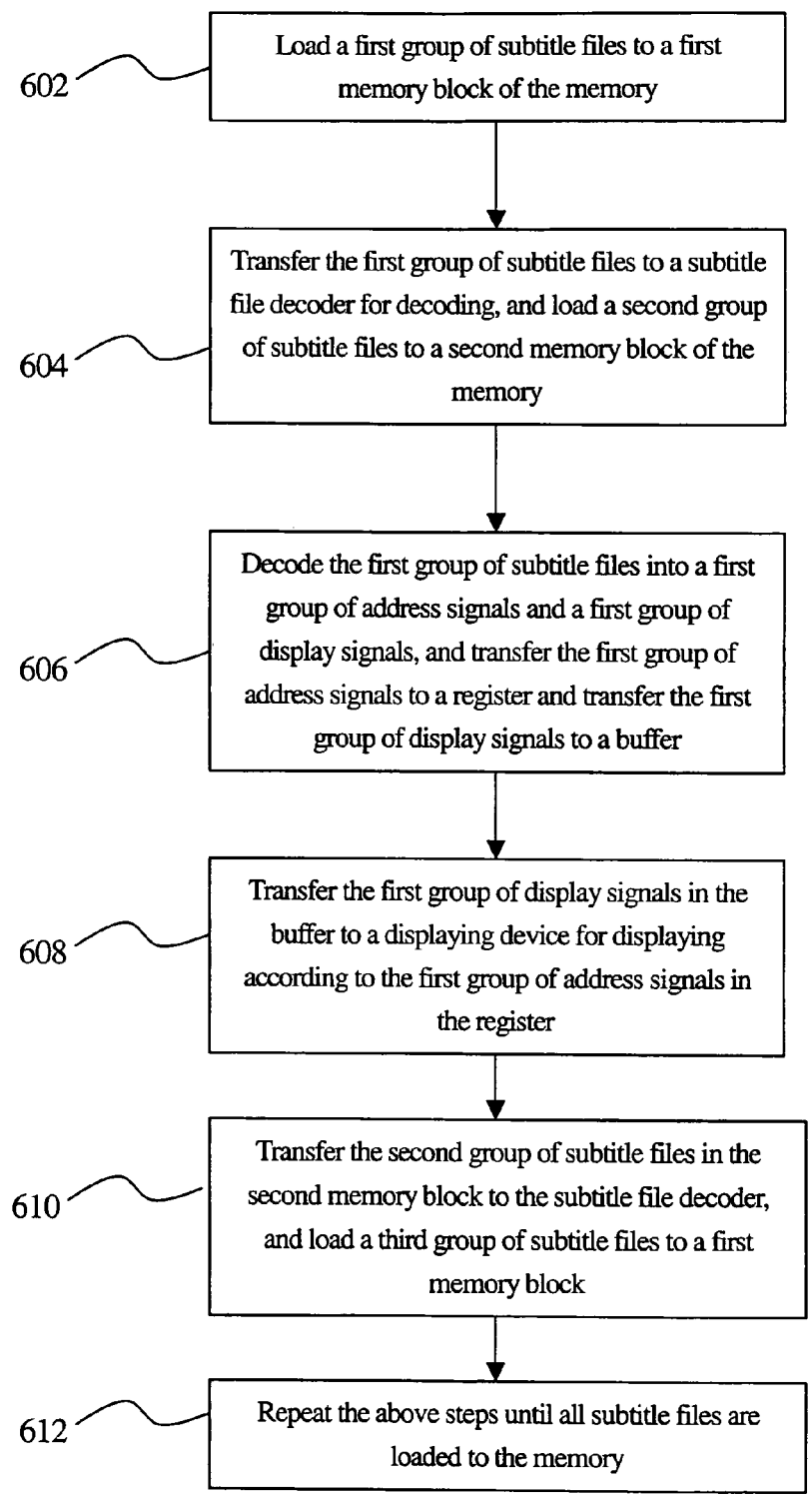
FIG. 6 is a flowchart illustrating the subtitle file playing method according to the present invention.

FIG. 6 is a flowchart illustrating the subtitle file playing method according to the present invention. The subtitle file playing method according to the present invention is utilized for playing the subtitle files in a disc. First, a first group of subtitle files is loaded into a first memory block of a memory (step 602). Next, the first group of subtitle files in the first memory block is transferred to a subtitle file decoder for decoding, while a second group of subtitle files is loaded into a second memory block of the memory (step 604). Thereafter, the first group of subtitle files transferred to the subtitle file decoder is decoded into a first group of address signals and a first group of display signals. The first group of address signals and the first group of display signals are stored in a register and a buffer, respectively (step 606). Afterward, the first group of display signals in the buffer is transferred to a displaying device for displaying according to the first group of address signals in the register (step 608). Next, the second group of subtitle files in the second memory block is transferred to the subtitle file decoder for decoding, while a third group of subtitle files is loaded into the first memory block of the memory (step 610). Then, the steps above are repeated for playing all subtitle files stored in the disc (step 612).

Although, in the embodiment described above, the step of loading subtitle files to the memory and step of transferring the subtitle files to the subtitle file decoder are performed concurrently, these two steps can also be performed sequentially. That is, the group of subtitle files previously stored in one memory block of the memory can be transferred to the subtitle file decoder first, followed by the loading of another group of subtitle files into another memory block of the memory. Of course, the timing of these two steps performed could also be overlapping in some cases.

Although, in the embodiment described above, the memory is divided into two memory blocks, it can be divided into more than two memory blocks (not shown in Fig.). The increased memory blocks can prevent the memory blocks from being filled with subtitle files before the subtitle file decoder can decode those subtitle files, so that it can also avoid interruptions or delays during the subtitle file playing. When going to the quantity and capacity of the memory blocks, it can be decided by two ways. It can be chosen to determine how many memory blocks first, and then divide the subtitle files into several groups of subtitle files with proper sizes. On the contrary, it can also be chosen to first determine the size of each group of subtitle files would be (maybe an average size of those groups of subtitle files), and then divide the memory into several memory blocks with the corresponding capacity. The capacity of those memory blocks can be equal or non-equal as mentioned above. Moreover, the capacity of memory blocks can be not fixed but flexible by the size of related group of subtitle files.

According to the subtitle file loading method of the present invention, the memory of the disc player is divided into memory blocks with several groups of subtitle files loaded into these memory blocks in an alternative process. During the same period, one group of subtitle files is transferred to the subtitle file decoder for decoding, while another group of subtitle files is loaded into the memory simultaneously. Therefore, interruptions and delays during subtitle files playing can be avoided because the subtitle files can be provided sequentially and continuously. Besides, the required memory capacity can also be minimized while compared with the memory capacity required in the prior art. Therefore, the manufacturing cost can be reduced significantly so as to increase product competitiveness.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A subtitle file playing method of a disc player for playing subtitle files, comprising:
    a) loading a first group of subtitle files into a first memory block of a memory;
    b) transferring the first group of subtitle files in the first memory block of the memory to a subtitle file decoder, and loading a second group of subtitle files into a second memory block of the memory;
    c) decoding the first group of subtitle files into a first group of address signals and a first group of display signals after the subtitle file decoder receives the first group of subtitle files from the first memory block, wherein the first group of address signals is transferred to a register, and the first group of display signals is transferred to a buffer;
    d) transferring the first group of display signals in the buffer to a displaying device for displaying according to the first group of address signals in the register;
    e) transferring the second group of subtitle files in the second memory block of the memory to the subtitle file decoder, and loading a third group of subtitle files into the first memory block of the memory; and
    f) repeating step b) to step e) until all subtitle files are played.

2. The subtitle file playing method of claim 1, wherein the subtitle files are loaded from a disc.

3. The subtitle file playing method of claim 1, wherein a capacity of the first memory block and a capacity of the second memory block are independent.

4. The subtitle file playing method of claim 1, wherein in step b), transferring of the first group of subtitle files in the first memory block to the subtitle file decoder is before loading of the second group of subtitle files into the second memory block of the memory.

5. The subtitle file playing method of claim 1, wherein in step b), transferring of the first group of subtitle files in the first memory block to the subtitle file decoder and loading of the second group of subtitle files into the second memory block of the memory are simultaneous.

6. The subtitle file playing method of claim 1, wherein when the memory includes a plurality of memory blocks, steps b) to e) are repeated for loading the subtitle files into the memory blocks, and after loading the subtitle files to the memory blocks, the subtitle files are loaded, beginning from the first memory block again.

7. A subtitle file playing system for a disc player, comprising:
    a memory having a plurality of memory blocks;
    a subtitle file decoder coupled to the memory for receiving subtitle files from the memory blocks and decoding the subtitle files into address signals and display signals;
    a register coupled to the subtitle file decoder for storing the address signals; and
    a buffer coupled to the subtitle file decoder for storing the display signals,
    wherein the subtitle files are loaded into the memory blocks sequentially,. and when a first group of subtitle files in one of the memory blocks is transferred to the subtitle file decoder, a second group of subtitle files is loaded into a subsequent memory block simultaneously.

8. The subtitle file playing system of claim 7, wherein after the subtitle files are loaded into a last one of the memory blocks, the subtitle files are loaded into a first one of the memory blocks again.

9. The subtitle file playing system of claim 7, wherein the memory is a DRAM, FIFO, EEPROM, and Flash Memory.

10. The subtitle file playing system of claim 7, wherein a capacity of one of the memory blocks is independent of that of another memory blocks.

* * * * *